US012008508B2

(12) United States Patent
Karpenko et al.

(10) Patent No.: US 12,008,508 B2
(45) Date of Patent: Jun. 11, 2024

(54) SYSTEMS AND METHODS FOR ITEM DELIVERY TO A SMART ITEM RECEPTACLE (71) Applicant: United States Postal Service, Washington, DC (US)

(72) Inventors: Christopher James Karpenko, Rochester, NY (US); William G. Ackerman, Washington, DC (US); Dominik Heinrich, New York, NY (US); Christiane Braun-Rubino, Long Island City, NY (US); Anthony Jones, Brooklyn, NY (US); Daniel Karlsson, Brooklyn, NY (US); Jordan Diatlo, New York, NY (US); Daniel Bersak, New York, NY (US)

(73) Assignee: United States Postal Service, Washington, DC (US)

(*) Notice: Subject to any disclaimer, the term of this patent is extended or adjusted under 35 U.S.C. 154(b) by 732 days.

(21) Appl. No.: 16/736,234

(22) Filed: Jan. 7, 2020

(65) Prior Publication Data
US 2020/0219051 A1 Jul. 9, 2020

Related U.S. Application Data (60) Provisional application No. 62/789,669, filed on Jan. 8, 2019.

(51) Int. Cl.
G06Q 10/0832 (2023.01)
G05B 19/042 (2006.01)
(Continued)

(52) U.S. Cl.
CPC ....... G06Q 10/0832 (2013.01); G06F 16/953 (2019.01); G06Q 10/0833 (2013.01);
(Continued)

(58) Field of Classification Search
CPC ........ G05B 2219/25257; G05B 19/042; G06Q 10/0832; G06Q 10/0833; G06F 16/953; H04L 12/2832
See application file for complete search history.

(56) References Cited

U.S. PATENT DOCUMENTS 9,223,315 B2    12/2015  Irwin et al.
9,609,973 B1 *   4/2017  Pleasant ............. A47G 29/1214
(Continued)

FOREIGN PATENT DOCUMENTS

JP      2004-026430 A    1/2004
WO   WO 2016/18582 A1    9/2016

OTHER PUBLICATIONS

S. K. a. Subramaniam, S. H. b. Husin, Y. b. Yusop and A. H. b. Hamidon, "Real time mailbox alert system via SMS or email," 2007 Asia-Pacific Conference on Applied Electromagnetics, 2007, pp. 1-4, doi: 10.1109/APACE.2007.4603963. (Year: 2007).*
(Continued)

Primary Examiner — Shannon S Campbell
Assistant Examiner — Manal A. Alsamiri
(74) Attorney, Agent, or Firm — Knobbe Martens Olson & Bear LLP (57) ABSTRACT A receptacle device which detects when mail has been delivered to the receptacle using a pressure sensor, IR beam, and/or a magnetic sensor. The receptacle device is connected to a wireless or wired network and is configured to communicate with a smart home system at the delivery point. The receptacle detects mail delivery and communicates this information via a network bridge to the smart home device of the recipient. The network bridge also gathers information from an informed delivery system which includes information regarding and images of mailpieces being delivered for a given day. The network bridge sends images of mailpieces which were delivered and additional mailpiece information (Continued)

to the recipient on the smart home system. For parcel, the network bridge can receive information regarding parcels to be delivered and can provide delivery estimates and visual tracking on a map.

17 Claims, 5 Drawing Sheets

(51) Int. Cl.
  *G06F 16/953* (2019.01)
  *G06Q 10/0833* (2023.01)
  *H04L 12/28* (2006.01)

(52) U.S. Cl.
  CPC ........ *H04L 12/2832* (2013.01); *G05B 19/042* (2013.01); *G05B 2219/25257* (2013.01)

(56) References Cited

U.S. PATENT DOCUMENTS

| | | | | |
|---|---|---|---|---|
| 10,016,083 | B1* | 7/2018 | Atieh | H04L 63/00 |
| 2002/0113703 | A1 | 8/2002 | Moskowitz et al. | |
| 2009/0015400 | A1 | 1/2009 | Breed | |
| 2009/0015405 | A1* | 1/2009 | DiPoala | G08B 13/186 |
| | | | | 340/556 |
| 2009/0192764 | A1* | 7/2009 | Radcliff | G01G 23/3735 |
| | | | | 342/357.46 |
| 2013/0038450 | A1* | 2/2013 | Stewart | G06Q 10/08 |
| | | | | 340/569 |
| 2013/0166060 | A1* | 6/2013 | Irwin | G07F 7/08 |
| | | | | 700/214 |
| 2013/0275326 | A1* | 10/2013 | Klingenberg | G06Q 10/087 |
| | | | | 705/336 |
| 2014/0330407 | A1 | 11/2014 | Corder et al. | |
| 2014/0330603 | A1* | 11/2014 | Corder | G05B 15/02 |
| | | | | 705/7.12 |
| 2015/0106293 | A1* | 4/2015 | Robinson | G06Q 10/0838 |
| | | | | 705/339 |
| 2015/0186840 | A1* | 7/2015 | Torres | A47F 10/02 |
| | | | | 705/339 |
| 2015/0310381 | A1 | 10/2015 | Lyman | |
| 2015/0349917 | A1* | 12/2015 | Skaaksrud | H04W 52/40 |
| | | | | 370/328 |
| 2015/0371187 | A1 | 12/2015 | Irwin et al. | |
| 2016/0019495 | A1* | 1/2016 | Kolchin | G06Q 10/0833 |
| | | | | 705/333 |
| 2016/0025549 | A1* | 1/2016 | Motoyama | G06Q 20/208 |
| | | | | 177/1 |
| 2016/0027261 | A1* | 1/2016 | Motoyama | G06Q 10/04 |
| | | | | 340/313 |
| 2016/0098678 | A1* | 4/2016 | Levy | G06Q 10/0836 |
| | | | | 705/339 |
| 2016/0148154 | A1* | 5/2016 | Tibbs | G06Q 10/0833 |
| | | | | 705/338 |
| 2016/0278558 | A1* | 9/2016 | Ansari | A47G 29/121 |
| 2017/0091710 | A1* | 3/2017 | Van Dyke | A47G 29/14 |
| 2017/0223807 | A1* | 8/2017 | Recker | H02J 7/34 |
| 2018/0374332 | A1* | 12/2018 | Waclawik | A47G 29/1209 |
| 2019/0318557 | A1* | 10/2019 | Amuduri | G06Q 50/12 |

OTHER PUBLICATIONS

Sebastian, B. Dec. 2015. "Intelligent Mailbox Systemwith Automatic Delivery Notification"<https://pdfs.semanticscholar.org/d8fd/ff82b1c6f2bee2ed9223b0a924c147ce6b80.pdf> (Year: 2015).*
Anonymous: "Mailbox Monitor | dgraves.org", Feb. 14, 2016, XP055682452, https://web.archive.org/web/20160214071632/http://dgraves.org/mailboxmonitor, retrieved Apr. 2, 2020.
International Search Report and Written Opinion dated May 22, 2017 in International Application No. PCT/US2017/023661.
International Preliminary Report on Patentability dated Sep. 25, 2018 in International Application No. PCT/US2017/023661.
Sebastian, B. "Intelligent Mailbox System and Automatic Delivery Notification" <https://pdfs.semanticscholar.org/d8fd/ff82b1c6f2bee2ed9223b0a924c147ce6b80.pdf> Dec. 2015, Retrieved Sep. 23, 2019.
Subramaniam et al. "Real time mailbox alert system via sms or email," 2007 Asia-Pacific Conference on Applied Electromagnetics, 2007, pp. 1-4, doi: 10.1109/APACE.2007.4603963. (Year: 2007).

* cited by examiner

SYSTEMS AND METHODS FOR ITEM DELIVERY TO A SMART ITEM RECEPTACLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority to U.S. provisional application 62/789,669, the entire contents of which are hereby incorporated by reference.

BACKGROUND

This application relates to systems and methods for identifying delivery events and providing delivery information to a user.

SUMMARY

In one aspect described herein, a method of delivering items comprises receiving scan information for an item intended for delivery to a delivery point; determining, via a processor, whether the item is associated with notification preferences; query, via a processor, an item database for item information associated with the item based on the notification preferences; determine, via a processor, whether the delivery point includes a receptacle having a delivery device; determine, via a processor, whether the delivery device has been activated; and generate, via a processor, a delivery notification based on the notification preferences.

In some embodiments, receiving scan information the item intended for delivery comprises receiving scan information from a scan of the item on item processing equipment of a distribution network.

In some embodiments, receiving scan information the item intended for delivery comprises receiving scan information from a scan of the item at the delivery point.

In some embodiments, the delivery device is positioned within the receptacle and comprises one or more sensors to detect the item.

In some embodiments, determining whether the delivery device has been activated comprises determining, via a processor, whether one of the one or more sensors detects the item within the receptacle.

In some embodiments, one of the one or more sensors comprises a pressure sensor.

In some embodiments, the method further comprises detecting a first item via the pressure sensor; determining an elapsed time from detecting the first item via the pressure sensor without detecting the removal of the item via the pressure sensor; and generating a notification if the elapsed time meets or exceeds a threshold time.

In some embodiments, one of the one or more sensors comprises a door sensor configured to detect whether the door is open.

In some embodiments, if the delivery device is determined not to have been activated, the processor does not generate the notification.

In some embodiments, the item information comprises tracking information.

In another aspect described herein, a delivery device comprises a shell adapted to be placed in an item receptacle; one or more sensors contained within the shell, the one or more sensors configured to generated a signal based on proximity of an item to the shell; a door sensor contained within the shell, the door sensor configured to generate a signal based on a status of a door of the item receptacle; and a processor contained within the shell in communication with the one or more sensors and the door sensor, wherein the processor is configured to: determine whether an item has been placed on the shell or in the item receptacle based on the signal from the one or more sensors; determine whether the door of the item receptacle has been operated based on the signal from the door sensor; and generate a communication that an item has been delivered to the item receptacle based on the determinations.

In some embodiments, the shell includes a top surface comprising a plurality of grooves and ridges.

In some embodiments, the one or more sensors comprise a pressure sensor configured to generate a signal in response to an item being placed on the shell.

In some embodiments, one of the one or more sensors comprises a reader adapted to read a computer readable code on the item when the item is placed in the item receptacle.

In some embodiments, the processor is further configured to communicate the computer readable code read from the item.

In another aspect, a delivery system comprises a delivery device, a server in communication with the delivery device; an item database in communication with the server, the item database containing item information; a user database in communication with the server, the user database comprising user information; wherein the server is configured to: receive, from the delivery device, the communication that the item has been delivered; query the user database to identify user information for intended recipient of the item; and send a notification to the intended recipient of the item based on the user information for the intended recipient.

In some embodiments, the system comprises a bridge component in wireless communication with the delivery device, the bridge component configured to receive communication and information from the delivery device, and to transmit the received communication and information to the server.

In some embodiments, the user information comprises user contact information and user preferences.

In some embodiments, the server is configured to generate notifications, based on the user preferences, if the delivery device detects that the item in the receptacle for a threshold period of time.

In some embodiments, the item information database comprises an image of the item, and wherein the notification comprises the image of the item.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

The system described herein provides for integration of item and delivery information with a smart home system, such as one utilizing a smart appliance, smart speaker, or other smart home device or ecosystem. A receptacle for receiving items can include a receptacle device or delivery device. The receptacle device or delivery device can be a device containing sensors to detect the presence of an item, a door of the receptacle, and to communicate this information with a network. The receptacle device or delivery device can conduct two-way communication with other devices, such as mobile computing devices, smart phones, tablets, etc., smart home devices, mobile delivery devices, and the like.

As one example, a distribution network such as the United States Postal Service (USPS) generates information for each item within the distribution network, including estimated delivery time, item identification, sender information, recipient information, item images, and the like. Distribution network systems can be integrated with smart home features and a receptacle device or delivery device in the receptacle to provide recipients and users access to item information to improve delivery efficiency, notification efficiency and accuracy, and delivery safety and security. Using APIs, cloud computing networks, and the like, a user can, via a user device, receive item location information, item images, and other desirable information about incoming items for delivery in order to allow the user to make informed decisions regarding the items in an easy and convenient interface.

Figure 1A:
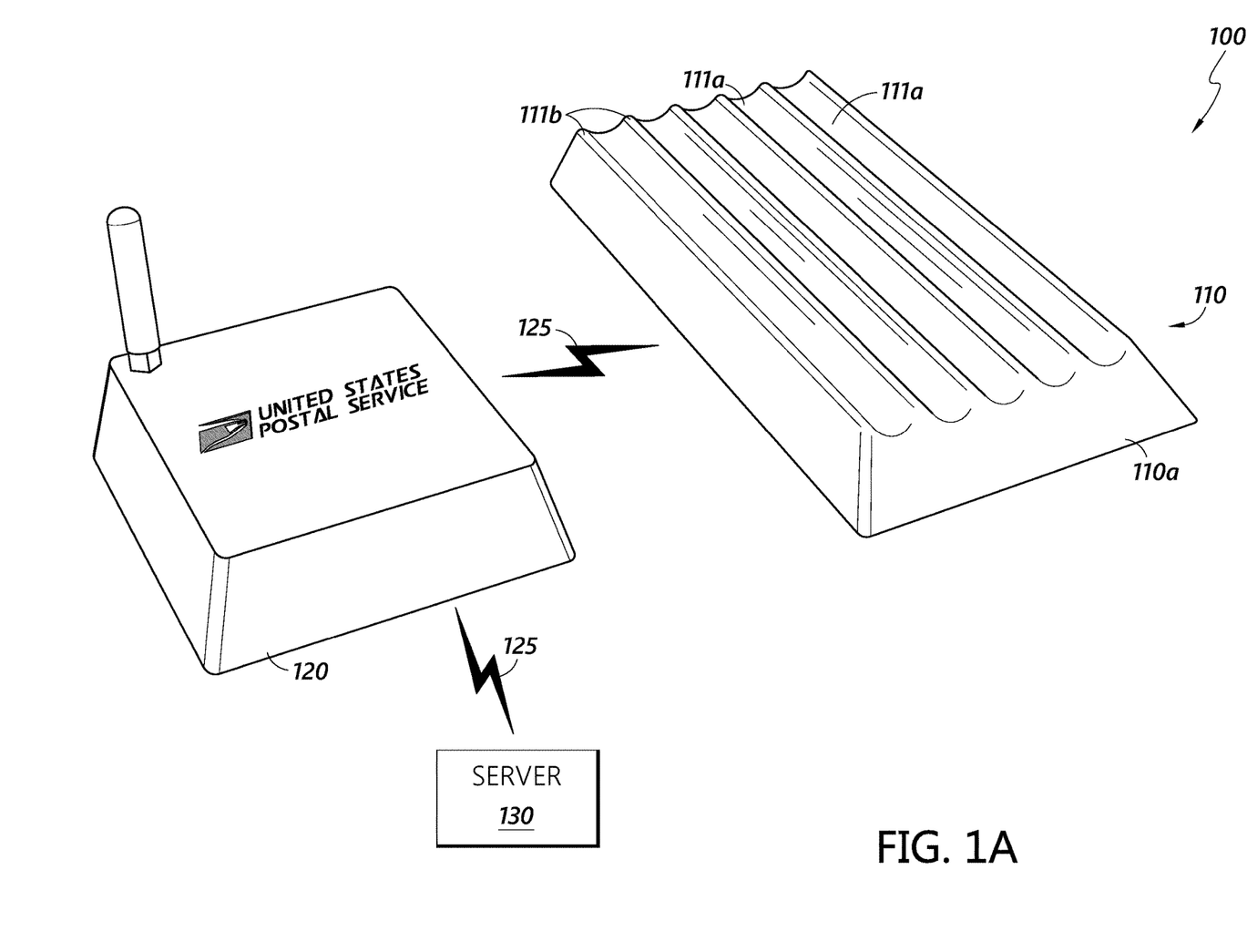
FIG. 1A depicts an embodiment of a system diagram for a smart item receptacle delivery system.

FIG. 1A depicts an embodiment of a system diagram for a smart item receptacle delivery system. A system 100 includes a smart receptacle device 110, a network component or bridge 120, and a server 130. The smart receptacle device 110 is configured to be installed in an item receptacle, such as, for example, a mailbox, or other similar volume for receiving distribution or delivery items. The smart receptacle device 110 can have a shell 110a comprising a plurality of grooves, valleys, or depressions 111a disposed among or between a plurality of ridges 111b. The plurality of grooves 111a and ridges 111b together can be used for receiving items on the smart receptacle device 110. In some embodiments, a delivery item, such as a letter, flat, envelope, or the like can be delivered such that the item is received within one of the plurality of grooves 111a, between two of the plurality of ridges 111b. Each of the plurality of grooves 111a can each have a weight sensor, photocell, or other sensor to detect an item on or in the individual grooves 111a. In some embodiments, the smart receptacle device 110 includes one or more sensors to detect the presence of an item within the receptacle and/or on the smart item receptacle device 110.

As shown in FIG. 1A, the plurality of grooves 111a and ridges 111b can form smooth symmetrical channels for receiving items. In some embodiments, the plurality grooves 111a and ridges 111b can form narrower slots, arranged, for example, in a sawtooth-type pattern, where the grooves 111a are not symmetrical, and having grooves deep enough to receive an item and to support the item in a vertical, upright, or non-horizontal position.

The smart receptacle device 110 can additionally comprise mounting features located on an underside or an end thereof. The mounting features can be pins, adhesive, magnets, threaded or non-threaded fasteners, and the like. In some embodiments, the smart receptacle device 110 can additionally comprise a mounting plate which is affixed to a surface of the receptacle, and has channels or receiving features thereon for receiving corresponding or complementary mounting features on the smart receptacle device 110.

When a parcel or package is delivered to the smart receptacle, the parcel or package can be placed on the smart receptacle device 110, and a surface of the parcel or package can be in contact with one or more of the plurality of ridges 111b. The smart receptacle device 110 can have a presence sensor, such as a weight sensor or photoelectric cell, to detect the presence of the item on the smart receptacle device 110.

The smart receptacle device 110 can also have sensors to detect opening of a receptacle door or access portal. The smart receptacle device 110 installed in an item receptacle can sense the presence of an item, and/or sense a delivery event for an item, and communicate the delivery event to a remote device. In FIG. 1A, the smart receptacle device 110 communicates to the bridge 120, which, in turn, communicates with a server.

The bridge 120 can be a hub configured to communicate with a networked server via a wired or wireless connection, with components of a smart home, an internet router, and the like. In some embodiments, the bridge 120 can be a part of a smart home device, such as a smart speaker, or similar device. The bridge 120 is configured to communicate with the smart receptacle device 110 and with a network via connection 125. The connection 125 can comprise an interne router, a network node, or other similar device. In some embodiments, the bridge 120 can be dedicated to communication with the smart receptacle device 110, and communicates with a smart home hub device. In some embodiments, the bridge 120 can communicate with the smart receptacle device 110 and other smart home appliances, such as a smart speaker, and user devices, such as smart phones, tablet computers, etc.

The connection 125 allows the bridge 120 to communicate with the server 130. The server 130 can comprise one or more computer terminals, network nodes, or other devices which are in communication with various portions of a distribution network computer system. The connection 125 can be facilitated by using APIs provided by the distribution network to allow the bridge 120 access to the server, or to receive notifications from the server 130.

Figure 1B:
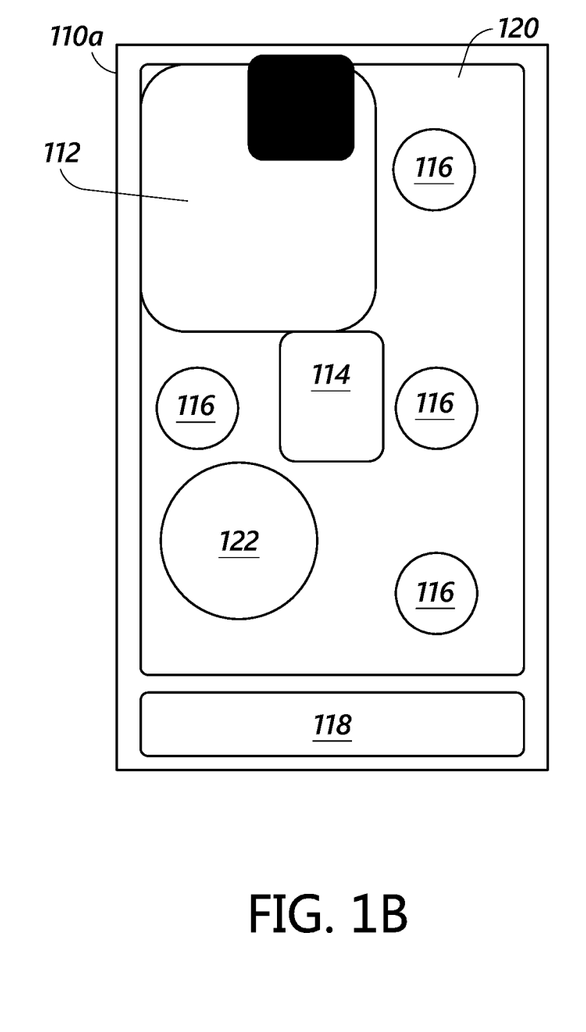
FIG. 1B depicts components of a receptacle device.

FIG. 1B depicts a diagram of the components of the smart receptacle device 110. The smart receptacle device comprises a processor 112, a reader 113, a pressure sensor 116, a door sensor 118, a communication device 120, and a power supply 122. The processor 112 is configured to direct all the components of the smart receptacle device 110 and to control communication with the bridge 120. The processor 112 can be computing board, one or more processing units, hardware processors, and the like. These are examples only and should not be construed as limiting.

The reader 114 can be a sensor for reading an identifier on an item placed in the smart receptacle and/or on the smart receptacle device 110. The reader 114 is in communication with the processor 112, and can be, for example, an RFID reader, a barcode scanner, an optical sensor, a NFC sensor, Bluetooth detector, and the like. Items delivered to the smart receptacle may have computer readable identifiers thereon, such as barcodes, RFID tags, Bluetooth circuits, and the like. The reader 114 is able to detect and read the computer readable identifier, which can then be communicated to the bridge 120 and to the server 130, and, ultimately to a recipient or other party. In some embodiments, the reader 114 is contained within the shell 110a of the smart item receptacle. In some embodiments, the reader 114 can be disposed above the smart item receptacle, or can be mounted to an internal surface of the smart receptacle, such that the reader 114 has a line of sight to sense an item delivered or a feature of the delivered item, such as the computer readable code on the item placed in the smart receptacle.

The pressure sensor 116 is contained within the shell 110a, and is configured to sense a change in pressure, or a weight, when an item is placed on the smart receptacle device 110 or is removed from the smart receptacle device 110. As noted above, the pressure sensor 116 can comprise a plurality of sensors corresponding to each of the grooves 111a for detecting which of the plurality of grooves 111a has an item therein or thereon. In some embodiments, the pressure sensor 116 can comprise a plurality of pressures sensors 116 extending along a length of the smart receptacle device, such as at a first end, in a middle, and at a second end of the smart receptacle device 110. The processor 112 can have circuitry configured to receive signals from the pressure sensor 116. The processor 112 can have circuitry configured to register or confirm an item presence when one or more of the pressure sensors 116 is activated. For example, in a case where there are three pressure sensors 116 in the smart receptacle device 110, the processor 112 may confirm an item detection when 2 or more of the pressures sensors 116 is activated. This can prevent spurious or incorrect determinations when only one of the pressure sensors 116 activates.

The door sensor 118 is configured to detect a state of the door of the smart receptacle, or a change of state of the door of the smart receptacle. In some embodiments, the door sensor 118 can be a photoelectric eye configured to detect when the door of the smart receptacle moves, or can be a magnetic sensor configured to detect a change in a magnetic field generated when the door moves, for example, when a metal door opens away from or toward the magnetic sensor. In some embodiments, the door sensor 118 is disposed at a first end of the smart receptacle device 110 proximate the shell 110a. When the smart receptacle device 110 is installed or placed in a receptacle, the first end is placed proximate the door with the door sensor 118 in close proximity to the door. When the door is operated, the door sensor 118 detects a change in state of the door, or detects the absence of the door in close proximity and the processor 112 or the door sensor 118 determines that the door has been opened. In some embodiments, the door sensor can be similar to those described in U.S. application Ser. No. 15/466,475 filed Mar. 22, 2017, the entire contents of which are hereby incorporated by reference.

The communication device 120 can include a communication circuit, an antenna, a transmitter/receiver, or any other components for communicating electronically with the bridge 120 or with another component 130. In some embodiments, the communication device 120 can be a cellular network, Wi-Fi, or data connection for communicating with the bridge. In some embodiments, the smart receptacle device 110 can communicate directly with the server 130 without communicating through the bridge 120.

The power source can include a battery, a solar panel, a wired power connection, a wireless power transfer circuit, and/or other components for providing power to the smart receptacle device 110.

Figure 1C:
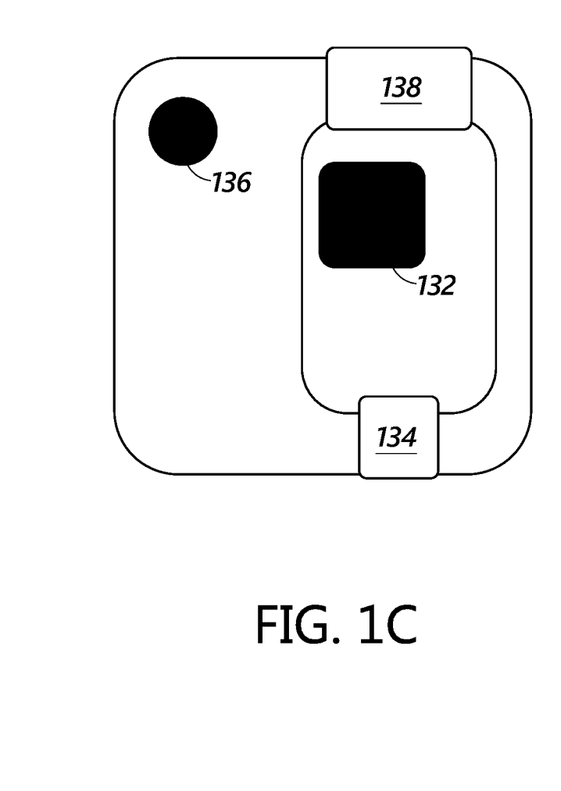
FIG. 1C depicts components of a bridge device.

FIG. 1C depicts a diagram of the components of the bridge 120. The bridge 120 can include a processor 132, a commination port 134, a communication device 136, and a power supply 138. The processor 132 can be similar to processors described elsewhere herein and is configured to control operation of components of the bridge 120 and the communications between the bridge 120 and other components. The communication port 134 can be, for example, an Ethernet port or other wired communication port. The communication device 136 can be similar to communication devices described elsewhere herein, and the power supply can be any desired power source for powering the bridge.

Figure 2:
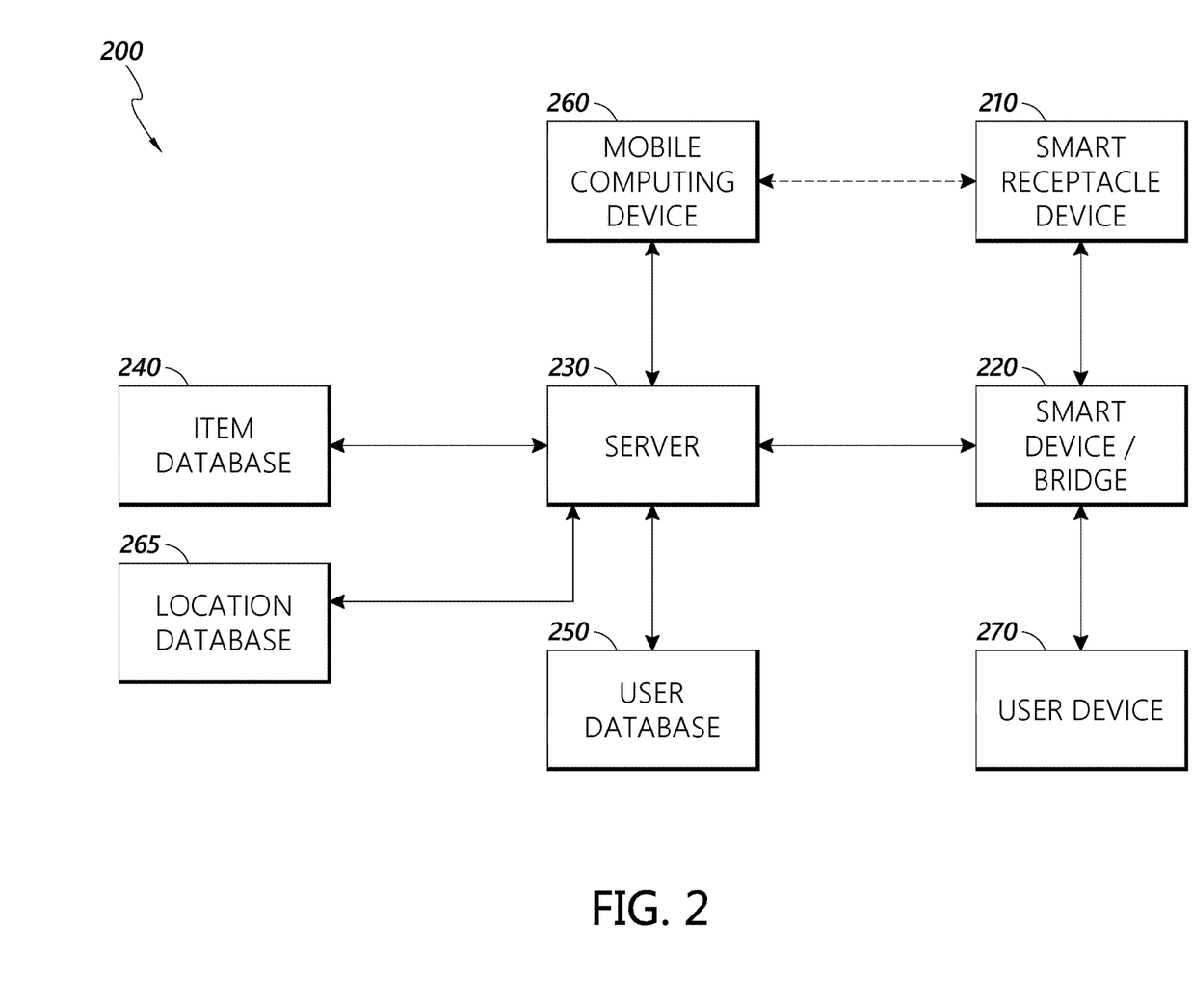
FIG. 2 is a block diagram depicting an embodiment of a smart item receptacle delivery system.

FIG. 2 is a block diagram depicting an embodiment of a smart item receptacle delivery system. A system 200 comprises a server 230 in communication with a smart device or bridge 220, an item database 240, a user database 250, a mobile computing device 260, and a location database 265. The smart device or bridge 220 and the server 230 can be similar to those described elsewhere herein. The bridge 220 is in communication with a smart receptacle device 210, which can be similar to those described elsewhere herein. In some embodiments, the server 230 is in direct communication with the smart receptacle device 210, without the need for an intervening bridge 220. The bridge 220 is also in communication with a user device 270. The user device 270 can be smart home component, such as a smart speaker. The user device 270 can be a mobile computing device, such as a smart phone, tablet computer, or any other type of computing device. In some embodiments, the bridge 220 can be in communication with a smart speaker, another smart home device, and a user device 270. In some embodiments, where the user device 270 is a smart phone, the smart phone can communicate with the bridge 220 via wireless router to which both are connected, or via a cellular network or other network, and need not be directly connected to the bridge 220.

The item database 240 stores information regarding distribution items. The distribution items can be items which are to be delivered, which are currently being delivered, and which have been previously delivered. The item information can include sender information, recipient information, item identifying information, one or more images of the item, and the like. In some embodiments, the item information can comprise an item record which links to or is associated with sender, a recipient, item identifying information, and/or item images in other memories, databases, etc.

The user database 250 can store user account information, including delivery preference information. The user database 250 can store account information for item recipients and potential item recipients, customers, and the like, and can record and store preferences selected by the recipients, potential recipients, customers. The user database 250 can store, either as part of the user account information or in addition to the user account information, contact information, or information relating to the smart device or bridge 220 and/or the smart receptacle device 210 registered to the user. The contact information can include an email address, number, or other information, which can be used to contact or send notifications to the user. In some embodiments the user database 250 stores identifiers, such as network addresses, serial numbers, or other electronic indicators for the user device 270, the bridge 220 associated with the user/customer, and the smart receptacle device 250, in order to correctly communicate with the devices associated with each user.

The mobile computing device 260 can be a computing device carried by a carrier or other personnel or vehicle of the distribution network. The mobile computing device 260 can be a smart phone assigned to a carrier and a delivery route. In some embodiments, the mobile computing device 260 can be similar to the mobile delivery device used by USPS personnel. The mobile computing device 260 can be configured to wirelessly communicate with the smart receptacle device 210. For example, the mobile computing device 260 can communicate with the smart receptacle device 210 when the mobile computing device 260 is within a proximity of, or within a geofence of the delivery point or delivery location where the smart receptacle device 210 is located. This wireless communication can occur using Bluetooth, Wi-Fi, Cellular, RFID, NFC, or other wireless communication protocol.

The location database 265 can store the location of items as they move through the distribution network. The location database 265 can also store tracking information showing where an item has been in the distribution network. The location database 265 can also store the location of item processing equipment, such as sorters, scanners, vehicles, mobile computing devices, and the like. When an item is processed on item processing equipment, the location of the item processing equipment processing the item can be stored and associated with an item record in the item database 240.

Figure 3:
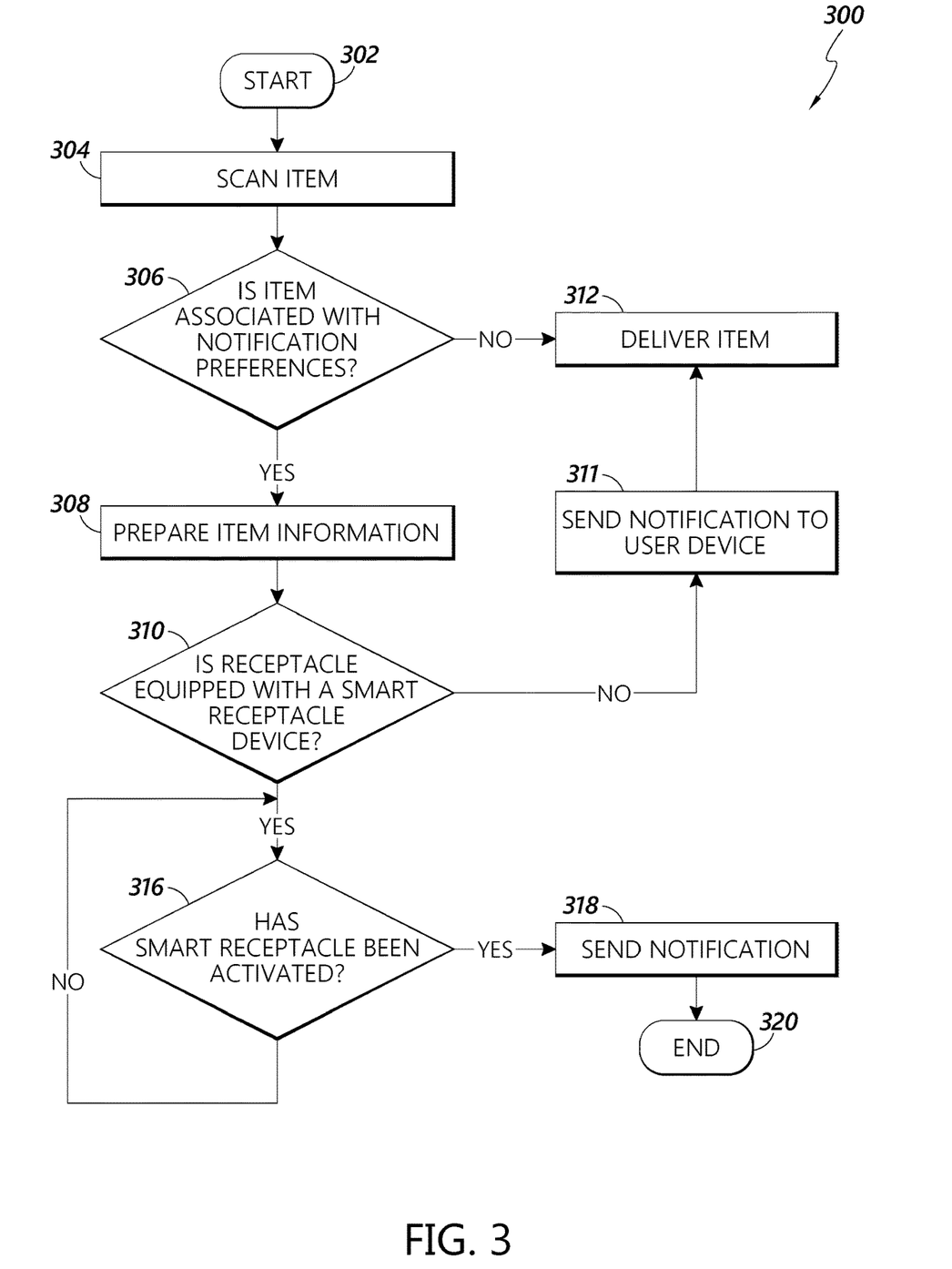
FIG. 3 is a flow chart depicting an embodiment of a process for delivering an item.

FIG. 3 is a flow chart depicting an embodiment of a process for delivering an item. A process 300 starts in block 302. The process moves to block 304, wherein an item is scanned. The item, such as an item in a distribution, mailpiece, or the like, is scanned on item processing equipment of a distribution network. An item moving within a distribution network will likely be scanned a plurality of times. For example, the item can be scanned at induction of the item into the distribution network, upon processing on item processing equipment, such as a facer, canceller, sorter, or other item processing equipment. An item can also be scanned when it is loaded on to a vehicle, unloaded from a vehicle, moved from one location to another, and at other times.

When an item is scanned at induction, or has an initial scan in the distribution network, an item record can be created and stored in the item database 240. In some embodiments, where an item has been electronically manifested, or where a code is created for the item prior to induction, the item record may have been created and stored previously and communicated to the item database 240. The item record includes a unique identifier corresponding to a computer readable code on the item to identify the item as it moves through the distribution network. In some embodiments, the unique identifier is also associated with a recipient or a user, and this association may be stored in the user database 250. The user database 250 can also store additional user information, such as whether the recipient has a smart item receptacle having a smart receptacle device 110/210 installed, for example, in the user's mailbox. The user database 250 can also store whether the user or recipient requests that notifications including item information, such as item location updates, item images, etc., be sent to the recipient.

When the item is scanned at induction, the item record is updated to record an induction scan. The induction scan time and location can be stored in or associated with the item record. At subsequent scans in the distribution network, the time, location, and other parameters associated with the scan be recorded and stored in or associated with the item record.

In some embodiments, the scan in block 304 is a scan of an item with a mobile delivery device at a delivery point.

The process 300 moves to decision state 306, wherein it is determined whether the item and/or the item's intended recipient is associated with a notification preference or smart receptacle device 110/210. The server 230 can determine whether the item is associated with notification preferences by receiving a query having the unique identifier for the item. From item processing equipment within the distribution network, including, for example, the mobile computing device. In some embodiments, the server 230 requests or reads the item record in the item database 240 for the scanned item. The item record can indicate whether the item is associated with notification preferences, or whether the intended recipient is associated with notification preferences. In some embodiments, the server can query the user database 250 for a record or entry associated with the intended recipient of the item. The user database 250 can indicate the specific delivery preferences, including information regarding the smart home, contact or notification information, and the like. The system 200 can determine whether the item has notification preferences in these ways, or in other ways that a person of skill in the art, guided by this disclosure, would understand.

For example, the system 200 can determine whether the intended recipient for the scanned item has signed up or has an account with the distribution network and has requested notifications be sent to user device 270 or smart device 220. In some embodiments, the system 200 can determine whether the intended recipient of the item has requested item information to be sent to the recipient as the item moves through the distribution network, or when the item is about to be delivered. In some embodiments, the item information can be a notification of items that are to be delivered on a given day, including an image of the item to be delivered.

If the system 200 determines that the item is not associated with a notification preferences, then the process 300 moves to block 312, and the item is delivered without the additional features described herein.

If the system 200 determines that the item is associated with a notification preference, the process 300 moves to step 308, wherein the item information is prepared for sending. In some embodiments, this can be accomplished by looking up the item record for the scanned item in the item database 240. The item record can have an image of the item which was taken during a processing operation on the item processing equipment. In some embodiments, the image was taken during an initial scan, such as an induction scan, and which was saved in the item database 240, or in another memory. The location of the image can be stored in the item record. In some embodiments, each time an item is processed on item processing equipment, an image can be taken of the item, and the item image can be stored in the item database 240, and can be sent to the server 230 along with the scan information. Step 308 can further include determining an estimated delivery time/date for the scanned items. The server 230 can determine, based on the intended delivery location and the location of the item processing equipment which scanned the item in step 304, a predicted delivery day, based on a known or predetermined routing path for the item through the distribution network. In some embodiments, the notification preferences may indicate that the notifications sent on a certain day are provided for items that are to be delivered that day. If the item scanned in step 304 is not estimated to be delivered on the day of the scan, then the notifications are not prepared for sending that day.

In some embodiments, the system does not need a scan of an item 304 to initiate this process. In such cases, the server 230 receives an electronic manifest or list of items that are intended for delivery on a particular day. The server 230 queries the item database for the item records for the items on the electronic manifest, queries the user database 250 for notification preferences, and the process 300 proceeds as described here.

In some embodiments, the processes associated with the decision state 306 can occur upon a scan of the item by the mobile computing device 260, such as when the item is out for delivery is intended to be delivered. In some embodiments, the processes associated with the decision state 306 can be initiated when a delivery resource having a mobile computing device 260 enters a geofence associated with the delivery point and the smart receptacle device 110/210. This determination can be made by comparing the location of the mobile computing device 260 with delivery point information in the location database 265. When the delivery resource, such as a carrier or vehicle, enters or approaches within a predetermined distance or time, the geofence for a smart receptacle device 110/210, the server 230 can query the item database to determine which items are intended for delivery to the delivery point in which geofence the delivery resource is located. If the item database 240 indicates that there are items for delivery to the delivery point having the smart receptacle device 110/210, the decision state 306 determines whether those items are associated with notification preferences.

If an item is determined to be associated with notification preferences, the process moves to block 308, wherein item information is prepared. The server 230 can gather or obtain item information, such as delivery time, sender identification, item identifiers, images of the item from item processing equipment, and the like, from the item database 240 and the user database 250. The item information can be prepared in order to be sent to the user as a notification. Block 308 can be performed at any point in the process 300, as desired.

The process 300 moves to decision state 310 wherein the system determines whether the intended recipient or intended delivery point for the item is associated with a smart receptacle device 210. This determination can made using information for the intended recipient stored in the item database 240, in the user database 250, or in another location accessible to the server 230. If the delivery point for the item has no smart receptacle 210 associated therewith, then the process moves to step 311, wherein the server 230 sends a notification of item to be delivered to a user's smartphone or computing device via, for example, an email, SMS, and the like. This notification can include images of the item to be delivered, and the item is delivered in step 312.

If the intended recipient or delivery point for the item is associated with a smart receptacle device 210, the process 300 moves to decision state 316, wherein it is determined whether the smart receptacle device 210 has been activated. The activation of the smart receptacle device 210 can occur upon delivery of the items to the item receptacle in which the smart receptacle device 210 is disposed. For example, if the smart receptacle device 210 is installed in a mailbox, when the mailbox is opened and the item is delivered, the smart receptacle device 210 can detect the item. In some embodiments, the server 230 can identify the activation of the smart receptacle device 210 by determining whether there is an item present based on the sensor 114 or the pressure sensor 116.

The smart receptacle device 210 then sends a signal regarding the item delivery to the bridge 220. The bridge 220 communicates with the server 230 that the item delivery has been completed.

In some embodiments, a smart receptacle device 210 can be activated regarding a delivery by receiving a signal from the mobile computing device 260 of the item carrier. For example, when the mobile computing device 260 comes within the geofence of the delivery point where the smart receptacle device is located, or is near enough to the smart receptacle device 210 to communicate with the smart receptacle device via short range connection, such as Bluetooth, etc., the server 230 can determine that the smart receptacle device 210 has been activated. The server 230 can look for a sensed door opening and/or change in the pressure sensor. If the detection of the mobile computing device 260 occurs around or near a time of a signal from the door sensor 118 or from the pressure sensor 116, the server 230 or other component can determine that the smart receptacle device 210 has been activated when the delivery resource enters the geofence of a delivery point, and GPS breadcrumb for the delivery resource indicates that the delivery resource is traversing an assigned or known route, and the geofence for the delivery point has been entered sequentially according to the assigned or known route.

In some embodiments, the server 230 can determine that the smart item receptacle 210

In some embodiments, if a USPS delivery resource has a parcel to deliver which does not fit in the mailbox in which the smart receptacle device 210 is located, the mobile computing device 260 can connect to the smart receptacle device 210 via a wireless protocol and communicate the unique identifiers of items that are being delivered to the delivery point. In some embodiments, this communication occurs when the mobile computing device 260 approaches within a predetermined distance or a geofence around the delivery point. The mobile computing device 260 can receive an input from the delivery resource, or can scan the items for delivery, which can indicate the items are parcels that are too large to fit into a mailbox. When the item to be delivered cannot fit in the smart item receptacle, the server 230 can still determine the smart receptacle device 210 has been activated if the item identifiers for the items too large to fit in the receptacle is received from the mobile computing device 260.

In some embodiments, the mobile computing device 260 can communicate with the smart receptacle device 210 and the smart receptacle device 210 can detect the item delivery. The smart receptacle device 210 can communicate both of these occurrences as confirmation of item delivery to the bridge 220.

In some embodiments, the item being delivered can have an active or passive identification tag, such as RFID, or similar device located thereon. The unique identifier of the item can be encoded in the active or passive identification tag. The smart receptacle device 210 can read the unique identifier or other information encoded in the tag, and can transmit the unique identifier or other information to the bridge 220. The bridge 220 can, in turn, transmit the item identifier to the server 230, and the server can receive confirmation that the item was delivered.

The process next moves to step 318 wherein a notification is sent. The notification for the delivered item can be sent by the server 230 to the bridge 220, which can display the notification in a video, audio, textual, or other desired format. In some embodiments, the bridge 220 sends the notification to a smart speaker, smart appliance, and the like. For example, when the delivery is confirmed, the server 230 sends a notification which includes the image of the item which was delivered, and other information related to the item, to the bridge 220. The bridge 220 causes the smart appliance, such as the smart fridge, a smart mirror device, or a video-capable smart home device, to display the images of the delivered items. In some embodiments, the system 200 can send the notification, for example, images of the items, whether the smart receptacle device 210 has been activated or not. For example, the server may prepare notifications, including images of the items, for items which are to be delivered to a delivery point on a particular day. The notifications can be sent in the morning to a smart home device such that the recipient can see in a smart mirror, on a smart home device, or in another location, images of the items which will be delivered that day. The notifications can be sent at any time selected or requested by the user, and this preference can be stored in the user database 250.

In some embodiments, the notification of items that will be delivered can be sent in the morning, and another notification can be sent when the item is delivered, as indicated by a smart receptacle device 210, and/or by the mobile computing device 260. The mobile computing device 260 can confirm delivery either by via communication with the smart receptacle device 210 or by a scan of the physical item, or both.

In some embodiments, the notifications can be stored in the bridge 220 until the recipient requests the notifications. For example, a recipient can ask a smart speaker, "what mail do I have today?" or other similar phrase. The smart speaker can provide the notification information received from the server 230 for the recipient.

The process 300 moves to step 320, where it ends.

In some embodiments, the process 300 can be initiated when a door open signal is generated by the door sensor 118 of the smart receptacle 110/210. In this case, the decision state 310 is not necessary, because the smart receptacle device 110/210 generates a signal. In this case, there need be no scan of the item by a mobile computing device 260. For example, when flats, envelopes, letters, or other mail items are delivered, the delivery resource may not scan the item when the item is delivered.

When the door sensor 118 detects an open signal, the processor 112, or the server 230, can receive the signal, and can wait for a signal from the reader 114 and/or the pressure sensor 116. If the pressure sensor 116 or the reader 114 receives a signal indicative of an item, the processor 112 or the server 230 determines that the smart receptacle device 110/210 has been activated.

The server 230 can query the item database 240 for the identity of items which were intended for delivery to the delivery point having the smart receptacle device 110/210. In the absence of a scan of the physical items, the server 230 determines a logical delivery event, and updates item records for items to be delivered (such as items that were scanned or identified as out for delivery earlier in the day), and sends notifications according to block 318.

In some embodiments, the items delivered to the smart receptacle have computer readable codes identifiable by the reader 114. If the reader 114 does detect and identify an item based on the computer readable code, the smart receptacle device 110/210 communicates the computer readable code and/or the item identifier to the server 230. The server 230 can then send a delivery notification for the item having the computer readable code thereon according to block 318.

In some embodiments, more than one recipient can receive items at a single delivery point, such as at a family home, roommates, or a business, and each individual may want notifications only when that individual's items are delivered. In such cases, the user database 250 can store family information, roommate information, business information, etc. A delivery point, such as a home, can have more than one individual living there, but which share an address. A user can input the names of others living in a home, such as children, parents, roommates, friends, etc., and provide separate notification or contact information for each of the people living at a delivery point. When an item is scanned, such as during an induction scan, an optical character recognition (OCR) process can read the address and the recipient. The address and recipient OCR'd from the item can be stored in the item record in the item database 240. The distribution network can OCR the image on each piece of item processing equipment, and can read the address and recipient each time, or, on subsequent scans of the same item, can access a previously stored image and OCR that image, or read the address and recipient information from the item record.

In some embodiments, the image generated on a scan of the item can be OCR'd and stored with the OCR'd information stored with the image as metadata. The server 230 can read the metadata for the image to identify the intended recipient and/or delivery point, or other desired information.

The item record for each item can include the intended recipient in the item record. The server 230 can determine which items are to be delivered, or have been delivered, which are intended for the different people living at a single delivery point. For example, if 4 pieces of mail are to be delivered to a delivery point, the item database 240 will store the intended recipients of the 4 mailpieces. If two mailpieces are intended for delivery to a first recipient at the delivery point, and two mailpieces are intended for delivery to a second recipient at the delivery point, when the notifications are sent, the first recipient will only receive notifications for the two items intended for the first recipient, and the second recipient will receive notifications only for the two items intended for the second recipient.

In some embodiments, the smart home system may have user access set up to identify different members of a household. The server can send notifications to the bridge 220 which identify the specific recipients, which can be stored until the intended recipient requests delivery notification.

For example, two recipients may receive items at a delivery point. The home has a single smart home system. The first recipient can ask a smart speaker for delivery notifications. The smart speaker can identify the requestor as the first recipient, and will provide audio or visual notifications for only the items intended for the first recipient. The same process can be used for the second user.

In a home where a parent and one or more children live, the smart device, such as a video enabled smart device can display a different icon for each member of the household who has items, such as mail or packages which are going to be or have been delivered. If a package is delivered which is addressed to a child, the delivery notification icon on the smart device can be customized and unique to that child. When the server 230 identifies that an item has been delivered which was intended for that child, the notification is sent to the bridge 220 identifying the recipient as the child. The bridge 220 can determine which icon should be displayed based on the identity of the item recipient.

The server 230 can prepare a notification for the address or delivery point which includes subsets or subgroups of items for each separate recipient at a delivery point. The notifications can also be sent to contact information associated with each recipient according to information stored in the user database 250.

Figure 4:
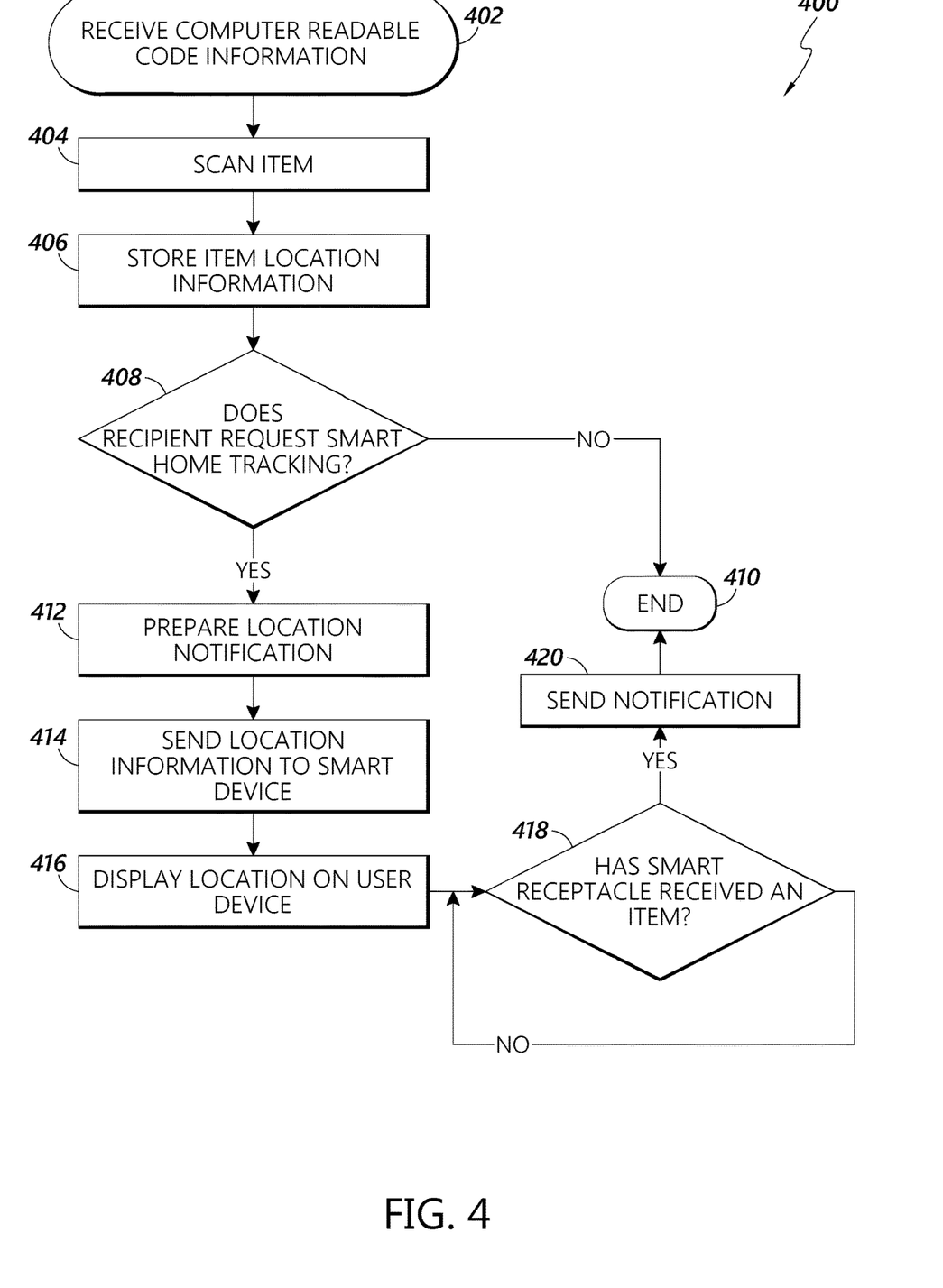
FIG. 4 is a flow chart depicting an embodiment of a process for tracking delivery of an item.

FIG. 4 is a flow chart depicting an embodiment of a process for tracking delivery of an item. A process 400 begins in step 402. The process 400 moves to step 404 wherein an item is scanned. This step can be similar to the item scanning described elsewhere herein.

The process 400 moves to step 406, wherein the item location information is identified and stored in the item database. For example, when the item is scanned at an induction facility, the item record is created or updated to include the induction scan. The server 230 receives information from the location database 265 regarding the geographic location of the item processing equipment which performed the induction scan. This process can be repeated for each scan that occurs for an item as it moves through the distribution network.

The process 400 moves to decision state 408, wherein it is determined whether the intended recipient of the item has requested smart home tracking. Smart home tracking preferences can be determined from user account information stored in the user database 250. Smart home tracking can include an application on a smart home device, such as a smart speaker, smart appliance, or other video-capable smart device, which will show an updated, real-time or near real-time map showing the progress of an item moving through the distribution network.

If the recipient does not request smart home tracking, the process 400 moves to step 410 and ends. If the recipient does request smart home tracking, the process 400 moves to step 412 where location information is prepared. The location information for the scans of the item can be retrieved from the item database 240. The process 400 moves to step 414, wherein the location information is sent to the smart device. The location information can be the geographic location of the last scan event for the item in the distribution network. The distribution network can also send the geographic location of the intended destination.

The process 400 moves to step 416, wherein the locations are displayed on a smart home device. The server 230 or the bridge 220 can run an application with a map and associated software thereon to put a pin, dot, or other indicator corresponding to the location of the last scan for an item. The intended destination or delivery point of the item can be illustrated on the map as well, and can be identified by a different icon, such as a house, a star, and the like. The origination location can also be identified on the map. The server 230 can retrieve sender information from the item or from a manifest. The geographic location of the sender can also be displayed on the map of the smart home device.

The process repeats for each scan event which occurs at a separate location. There may be cases where multiple scan events occur in the same facility, or occur very quickly back-to-back. The server 230 can remove or can combine these scan events into a single event, and can send the location information to the smart home for only the single scan event or the combined scan event.

The process 400 next moves to decision state 418, wherein it is determined whether the smart receptacle device 210 has received the item. The smart receptacle device can detect a delivery using processes similar to those described elsewhere herein. If the smart receptacle has not received the item, the process 400 repeats decision state 418 at a later point in time. If the smart receptacle has received the item, the process 400 moves to step 420, wherein a notification of the delivery is sent. The sending of the notification can be similar to processes and methods described elsewhere herein.

The process 400 ends in step 410.

In an example where an item is ordered, the user or intended recipient can identify the USPS as the distribution network to deliver the item, or as the delivery agent. When the item is ordered, the merchant sends information to the server 230, and the server 230 can create an item record, and track the item location as described herein. When the item record is created, the server 230 can send information to the bridge 220 regarding item delivery. Using APIs, applications, or other software, the bridge 220 can display on a video-enabled smart device a map having a circle at an origination point and a star at the intended destination, for example, at the home of the recipient.

As the item is scanned at a USPS facility, the location of the scan is sent to or received by the bridge 220, where the map is updated with an indicator, such as a dot at the geographic location of the scan event, or with a line connecting the previous location with the current location. Location information for the item can also be received from mobile computing devices 260 in vehicles or carried by personnel USPS. As the location changes while the item is on a vehicle, in transit, being carried, etc., the server 230 can send or the bridge 220 can pull the updated location of the item. The server 230 can also provide or send an image of the vehicle the item is on, either the actual vehicle or a stock photo indicative of the type of vehicle the item is on.

The recipient can get a real-time or near real-time update of the location of the item as it is shipped from the origination location to the intended destination. In some embodiments, the bridge 220 can report the location in an audio or video format upon request.

In some embodiments, where the item being delivered is a gift, such as for a birthday, the location of the scan event for the item can be represented by an icon of a wrapped present. If the gift is a Christmas gift, the scan event location can be represented by a Christmas tree icon, or other desired icon. When the item is ordered, the ordering application, or the merchant can also communicate with a user account or the bridge 220, and allows for a selection of an icon to be made.

In some embodiments, the smart receptacle device 210 can be used to inform a user when an error state exists, such as if the receptacle door is left open, unlocked, or if items have been present for an extended period of time. The processor 112 of the smart receptacle device 210 can start a timer when the door sensor 118 detects the door of the receptacle has opened. If a set period of time elapses, such as 15 minutes, 30 minutes, 1 hour, 2 hours, or any other desired time elapses, the processor 112 can send a door open signal to the bridge 220 or the server 230. The door open notification can then be communicated to the user device 270 or via the smart device/bridge 220.

In some embodiments, the processor 112 can detect an item delivery via the pressure sensor 116. When the pressure sensor 116 is activated, the processor 112 or the server 230 can start a timer. If the pressure sensor 116 stays activated, or detects a pressure or weight for a predetermined period of time, a reminder can be sent to the user to pick up the items. In some embodiments, the predetermined period of time can be 1 day, 2 days, a week, or any other desired time period.

In some embodiments, after the pressure sensor 116 has been activated with a first weight, when the pressure sensor 116 detects an increased weight or pressure, the processor 112 can determine that a second delivery of item(s) has occurred. The processor 112 or server 230 can determine whether the second delivery occurred on a different day than the first delivery. The processor 112 can then identify if a third signal, indicating the pressure or weight has increased occurs, and can determine if this is a third delivery on a third day. This process can be repeated. The processor 112 and/or the server 230 can determine that a user is away from home or from the delivery point after repeated deliveries have been detected with no items being picked up as indicate by a reduction in weight on the pressure sensor 116. The server can determine that a user is away from the delivery point, such as on vacation, when 2, 3, 4, or more deliveries happen on subsequent days without the items being picked up. As one example, if 2 deliveries on 2 different days are detected without items being picked up, the server 230 or the processor 112 communicates a pick-up reminder to the user. If a $3^{rd}$ delivery on a $3^{rd}$ day is detected, the server 230 can determine whether the user has provided any away preferences and stored them either in the user database 250, or has set preferences with the smart device 220.

In this case, the server 230 could start a hold mail process, where additional items will not be delivered until a subsequent item pick up event is determined by the processor 112 and the pressure sensor 116. When the pressure sensor detects a reduction in weight, weight goes to zero, the server 230 determines that the user has returned, and the mail hold is lifted, and items are once again delivered to the smart receptacle.

In some embodiments, when a predetermined time period has elapsed, for items to be picked up, or several deliveries of items have occurred without a pickup, the server 230 can determine whether the user has set preferences regarding being away. The server 230 can instruct the smart home/bridge 220 to take additional actions, such as operating other smart home devices, such turning down a thermostat, activating automatic light cycles, etc., commensurate with a resident being away from home. In some embodiments, the server 230 sends a request to the user asking whether the user would like the away preferences to be activated.

In some embodiments, the pressure sensor 116 can detect a weight at or above a threshold. The weight may be a result of a single delivery, or of multiple deliveries. A weight at or above the threshold is indicative of a receptacle being full.

The processor 112 can communicate to the bridge 220 and/or to the server 230 regarding the weight. The bridge 220 and/or the server 230 can generate a notification regarding the receptacle being full or at capacity and send the notification to the user device 270.

In some embodiments, the server 230 can determine which items were delivered to a smart receptacle using information from the item database 240. The item database 240 can have item dimensions stored therein. The user database 250 may also store dimension information for the smart receptacles, such as was provided to the server 230 upon a user registering the smart receptacle. The server 230 can use the information from the smart receptacle device 210, the item dimensions from the item database 240 and the receptacle information from the user database to determine whether the receptacle has remaining capacity or if it is full. If the item dimensions from the item database 240 are such that the item occupies more than half, more than 75%, more than 90%, or any other amount, of the volume of the receptacle, the server 230 prepares and sends a receptacle full message to the user device 270. If the receptacle is determined to be full, the server 230 can implement an item hold, such as a hold mail process. In some embodiments, the user can be notified and asked whether the user would like subsequent items to be held until the user returns.

In some embodiments, when the server 230 identifies that an item has been picked up, such as when the reader 114 and/or the pressure sensor 116 indicates the absence of an item or the removal of an item at or around the time of a door open signal, the server 230 can provide content to the user device 270 that is related to the item picked up. The server 230 and the item database 240 can store information regarding the identity of the items in the receptacle, the senders of the items in the receptacle, etc. When an item is picked up, additional content, such as a targeted ad, a coupon, an offer, augmented reality content, video, etc., can be sent to the user device 270 or to the smart device 220 at or around a time the item is picked up. A smart speaker can play a notification, an ad, indicate an offer, etc., in response to the pickup event. Other smart connected devices can also be caused to operate or take action in response to the pickup of an item.

It is to be recognized that depending on the embodiment, certain acts or events of any of the methods described herein can be performed in a different sequence, may be added, merged, or left out altogether. Not all described acts or events are necessary for the practice of the method. Moreover, in certain embodiments, acts or events may be performed concurrently, for example, through multi-threaded processing, interrupt processing, or multiple processors, rather than sequentially.

Although above steps of the above processes have been described a particular order, the steps are not limited to performance in the order indicated. It will be understood by a person of skill in the art, guided by the teachings herein, that the steps of the processes described herein may be performed in one or more orders, as desired. A person of skill in the art will further recognize than the above-outlined steps can be performed in any desired order, and can include sub-steps or sub-processes.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, servers, memories, hardware, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the disclosure as applied to various embodiments, it will be understood that various omissions, substitutions, and changes in the form and details of the device or process illustrated may be made by those skilled in the art without departing from the spirit of the disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor known or commonly used in the art. In addition, the microprocessor may be any conventional special purpose microprocessor such as a digital signal processor or a graphics processor. The microprocessor typically has conventional address lines, conventional data lines, and one or more conventional control lines.

The systems described herein may be used in connection with various operating systems such as Linux®, UNIX®, MacOS®, Microsoft Windows®, and/or mobile operating systems such as iOS, Android, and the like.

The system control may be written in any conventional programming language such as C, C++, BASIC, Pascal, .NET (e.g., C#), or Java, and run under a conventional operating system as known in the art. C, C++, BASIC, Pascal, Java, HTML, FORTRAN, and other industry standard programming languages may be used. The system control may also be written using interpreted languages such as Perl, Python, or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged, or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of delivering items comprising:
   receiving, in one or more processors, from item processing equipment, scan information for an item intended for delivery to a delivery point;
   determining, via the one or more processors, whether the item is associated with notification preferences;
   querying via the one or more processors, an item database for item information associated with the item based on the notification preferences;
   determining that a delivery device disposed within a receptacle at the delivery point has been activated, the delivery device comprising a shell housing one or more sensors and a wireless communication device;
   determining that a first item has been deposited in the receptacle based on the activation of the delivery device;
   sending, to a network bridge component, via the wireless communication device of the delivery device, activation information based on determining the delivery device has been activated, wherein the network bridge component is located remote from the receptacle and is associated with one or more recipients and the receptacle;
   determining that a second item has been deposited within the receptacle via the pressure sensor without detecting the removal of the first item via the pressure sensor;
   determining an elapsed time between determining the first item has been deposited and determining the second item has been deposited;
   if the elapsed time exceeds a threshold time, sending, to item processing equipment an instruction to reroute an additional item to be delivered to the delivery point;
   sending, by the one or more processors in communication with and remote from the network bridge component, a notification regarding rerouting the additional item;
   in response to the elapsed time exceeding the threshold time, generating, in the one or more processors, an item hold notification;
   sending the item hold notification to the network bridge component.

2. The method of claim 1, wherein the item processing equipment comprises an item sortation machine, and wherein receiving scan information for the first item intended for delivery comprises receiving scan information from a scan of the first item on the item sortation machine of a distribution network.

3. The method of claim 1, wherein the item processing equipment comprises a mobile delivery device of a carrier, and wherein receiving scan information for the item intended for delivery comprises receiving scan information from a scan of the item using the mobile delivery device at the delivery point.

4. The method of claim 1, wherein determining whether the delivery device has been activated comprises detecting, via one or more sensors of the delivery device, the first item in the receptacle.

5. The method of claim 1, wherein the delivery device is removably disposed within the receptacle.

6. The method of claim 1, wherein determining whether the delivery device has been activated further comprises sensing, via one or more pressure sensors of the delivery device, the first item within the receptacle.

7. The method of claim 6, wherein the one or more sensors is a pressure sensor.

8. The method of claim 4, further comprising detecting whether a door of the receptacle is open via a door sensor disposed on the door.

9. The method of claim 1, wherein if the delivery device is determined not to have been activated, the one or more processors do not generate the item hold notification.

10. The method of claim 1, wherein querying the item database for item information associated with the first item comprises identifying tracking information for the item.

11. The method of claim 1, wherein the network bridge component is further in communication with a home network of a recipient of the item.

12. The method of claim 11, further comprising sending the item hold notification from the network bride component to the home network of the recipient of the item.

13. The method of claim 1, wherein the item hold notification comprises an image of the additional item to be delivered, and wherein sending the item hold notification comprises sending the image of the additional item to be delivered to the network bridge component.

14. The method of claim 1 further comprising, communicating, from the network bridge component, the item hold notification to a smart home device in the home of the recipient.

15. The method of claim 1, wherein the scan information includes a recipient name to whom the first item is intended to be delivered.

16. The method of claim 15, wherein the item hold notification includes the name of the recipient to whom the first item is intended to be delivered.

17. The method of claim 1, wherein the shell of the delivery device comprises a top surface configured to detect the presence of an item on the top surface thereof.

* * * * *

UNITED STATES PATENT AND TRADEMARK OFFICE
CERTIFICATE OF CORRECTION

| | | |
|---|---|---|
| PATENT NO. | : 12,008,508 B2 | Page 1 of 1 |
| APPLICATION NO. | : 16/736234 | |
| DATED | : June 11, 2024 | |
| INVENTOR(S) | : Christopher James Karpenko et al. | |

It is certified that error appears in the above-identified patent and that said Letters Patent is hereby corrected as shown below:

On the Title Page

On Page 2, Column 2, Line 1, item (56) under Other Publications, delete "B." and insert --B. --.

On Page 2, Column 2, Line 1, item (56) under Other Publications, delete "Systemwith" and insert --System with--.

In the Specification

In Column 4, Line 62, delete "interne" and insert --internet--.

In Column 10, Line 52, delete "210" and insert --210.--.

In the Claims

In Column 20, Claim 3, Line 67, delete "item" and insert --first item--.

In Column 21, Claim 3, Line 2, delete "item" and insert --first item--.

In Column 22, Claim 12, Line 5, delete "bride" and insert --bridge--.

Signed and Sealed this
Tenth Day of December, 2024

Katherine Kelly Vidal
*Director of the United States Patent and Trademark Office*